H. C. NEER.
Pneumatic Fire-Engine and Lawn-Sprinkler.
No. 132,407. Patented Oct. 22, 1872.
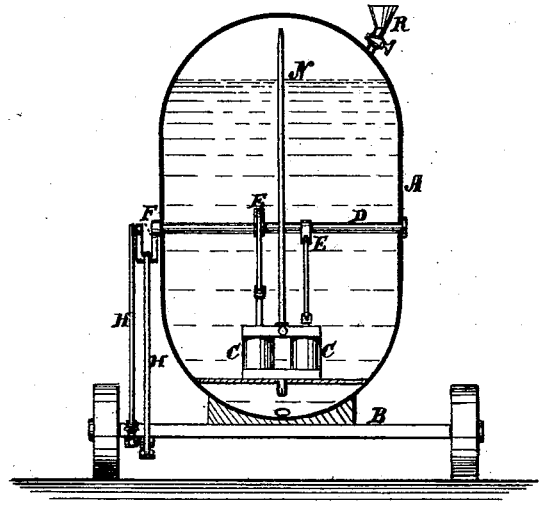
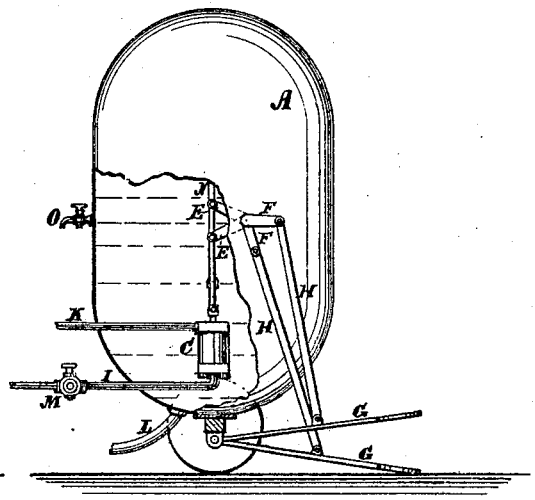
Witnesses:
Inventor;
H. C. Neer
Per
Attorneys.

UNITED STATES PATENT OFFICE.

HENRY C. NEER, OF PARK RIDGE, NEW JERSEY.

IMPROVEMENT IN PNEUMATIC FIRE-ENGINES AND LAWN-SPRINKLERS.

Specification forming part of Letters Patent No. 132,407, dated October 22, 1872.

*To all whom it may concern:*

Be it known that I, HENRY C. NEER, of Park Ridge, in the county of Bergen and State of New Jersey, have invented a new and Improved Pneumatic Fire-Engine and Lawn-Sprinkler, of which the following is a specification:

My invention consists of a stationary or portable tank of sheet metal, adapted to bear great internal pressure, with two pumps arranged within it, and adapted for compressing air, also for injecting water in some cases; the pumps being worked by a foot-treadle connection, which is also adapted for the application of a hand-crank. The tank is also provided with a funnel with a stop-cock for being filled by pouring water in when the air-pressure is off, in case it is not convenient to introduce the water by the pumps. The object is to provide a machine which may be kept charged with water and compressed air for use in shops, factories, &c., ready for instantaneous use for extinguishing fires in their early stages, when a small quantity of water will suffice if quickly applied. It is also designed to afford a much better and more convenient apparatus to be moved about on wheels for sprinkling lawns than those in which the water is expelled by a pump.

Figure 1 is a sectional elevation of one arrangement by which my improvement can be practically carried out, and Fig. 2 is partly a side elevation and partly a sectional elevation of the same. Fig. 3 is a section, showing the arrangement of the cock in the pipe leading to the pump at one end.

Similar letters of reference indicate corresponding parts.

A represents the sheet-metal tank, which, by preference, will be of cylindrical shape with oval ends, as being the best form for resisting internal pressure. B represents a truck on which it may be mounted, preferably on one end. C represents a pair of pumps arranged within it, with their rods connected to the oscillating shaft D by arms E. The said shaft extends through the sides of the tank in stuffing-boxes, and has two arms, F, at one end, each having treadle G connected to it by a rod, H, all so that by working the treadles by the feet the pumps will be operated simultaneously in opposite directions. I propose to have these pumps double-acting, with a water-pipe connection, I, attached to the lower ends, and an air-pipe connected to the upper ends, so that I can, at the same time, fill the tank with water and compress the air above it for expelling it through the hose L; but in case the water fills faster than the air, I provide a cock, M, in pipe I, which will shut off the water and allow the air to flow in, so that both ends of the pumps will work air; or the lower ends may be neutralized by having the check-valve in the pipe I kept open. N represents an air-pipe for conveying the air from the pumps to the upper portion of the tank. The water may be poured into the tank through a funnel, R, if required. Said funnel has a stop-cock to close the tank when filled. O is an exhaust-cock for testing the height of the water in the tank.

For sprinkling lawns machines of this kind will be found much better than those of the ordinary sort, because they may be charged at leisure, and will require only the manipulation of the hose for sprinkling after the cock in the pipe L is opened; and for extinguishing fires in buildings they will be ready for being instantly set in action, which is of great importance.

I may, of course, arrange the pumps outside the tank, but for making a symmetrical apparatus and protecting the pumps I prefer to arrange them inside.

Having thus described my invention, I claim as new and desire to secure by Letters Patent—

A lawn-sprinkler and fire-engine, consisting of a chamber A and truck B, provided with pump and treadle mechanism, arranged as described, so that water and air may simultaneously be forced into the chamber before use of the machine, while the sprinkling-pipes will only require to be opened and the truck set in motion to make the machine work.

H. C. NEER.

Witnesses:
ANSON P. THAYER,
T. B. MOSHER.